US006946617B2

(12) United States Patent
Brandt et al.

(10) Patent No.: US 6,946,617 B2
(45) Date of Patent: Sep. 20, 2005

(54) METHOD AND APPARATUS FOR ALIGNMENT OF COMPONENTS OF A PLASMA ARC TORCH

(75) Inventors: Aaron D. Brandt, West Lebanon, NH (US); Richard R. Anderson, Grantham, NH (US); Brian J. Currier, Newport, NH (US); Jon W. Lindsay, West Lebanon, NH (US); Zheng Duan, Hanover, NH (US); Casey Jones, Enfield, NH (US); Edward M. Shipulski, Etna, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 10/411,801

(22) Filed: Apr. 11, 2003

(65) Prior Publication Data

US 2004/0200810 A1 Oct. 14, 2004

(51) Int. Cl.[7] .......... B23K 10/00
(52) U.S. Cl. .......... 219/121.49; 219/121.5
(58) Field of Search .......... 219/121.49, 75, 219/121.48, 121.5; 313/231.31

(56) References Cited

U.S. PATENT DOCUMENTS

| | | | | | |
|---|---|---|---|---|---|
| 3,818,174 | A | | 6/1974 | Camacho | 219/121 P |
| 4,059,743 | A | * | 11/1977 | Esibian et al. | 219/121.36 |
| 4,549,065 | A | | 10/1985 | Camacho et al. | 219/121 PM |
| 4,596,918 | A | * | 6/1986 | Ponghis | 219/121.48 |
| 4,650,956 | A | | 3/1987 | Marhic et al. | 219/121 PY |
| 4,718,477 | A | | 1/1988 | Camacho | 164/495 |
| 5,208,442 | A | | 5/1993 | Ahola et al. | 219/121.52 |
| 5,329,089 | A | | 7/1994 | McGee et al. | 219/121.45 |
| 5,416,296 | A | | 5/1995 | Walters | 217/121.5 |
| 5,420,391 | A | | 5/1995 | Delcea | 219/121.47 |
| 5,609,921 | A | | 3/1997 | Gitzhofer et al. | 427/446 |
| 5,624,586 | A | | 4/1997 | Sobr et al. | 219/121.48 |
| 5,660,743 | A | | 8/1997 | Nemchinsky | 219/121.5 |
| 5,756,959 | A | | 5/1998 | Freeman et al. | 219/121.49 |
| 5,811,055 | A | | 9/1998 | Geiger | 266/49 |
| 5,841,095 | A | | 11/1998 | Lu et al. | 219/121.48 |
| 5,859,403 | A | * | 1/1999 | Zigliotto | 219/121.49 |
| 5,906,758 | A | | 5/1999 | Severance, Jr. | 219/121.5 |
| 6,066,827 | A | | 5/2000 | Nemchinsky | 219/121.52 |
| 6,215,090 | B1 | | 4/2001 | Severance, Jr. et al. | 219/121.48 |
| 6,346,685 | B2 | | 2/2002 | Severance, Jr. et al. | 219/121.5 |
| 6,403,915 | B1 | | 6/2002 | Cook et al. | 219/121.52 |
| 6,424,082 | B1 | | 7/2002 | Hackett et al. | 313/231.31 |
| 6,657,153 | B2 | | 12/2003 | McBennett et al. | 219/121.52 |
| 6,686,559 | B1 | | 2/2004 | Walters | 219/121.52 |
| 2001/0007320 | A1 | | 7/2001 | Severance, Jr. et al. | 219/121.48 |

FOREIGN PATENT DOCUMENTS

| | | | |
|---|---|---|---|
| GB | 2192821 | * | 1/1988 |
| JP | 0305370 | | 7/2003 |
| WO | WO 90/10366 | | 9/1990 |
| WO | WO 03/089179 | | 10/2003 |
| WO | WO 03/089180 | | 10/2003 |
| WO | 03/089182 A1 | | 10/2003 |
| WO | WO 2004/093116 | | 10/2004 |

OTHER PUBLICATIONS

Notification of Transmittal of The International Search Report and the Written Opinion of the International Searching Authority, or the Declaration for International Patent Application No. PCT/US2004/011072, date of mailing Aug. 30, 2004, 12 pages.

* cited by examiner

*Primary Examiner*—Teresa J. Walberg
(74) *Attorney, Agent, or Firm*—Proskauer Rose LLP

(57) ABSTRACT

A coolant tube and electrode are adapted to mate with each other to align the tube relative to the electrode during operation of the torch. Improved alignment ensures an adequate flow of coolant along an interior surface of the electrode. In one aspect, an elongated body of the coolant tube has a surface adapted to mate with the electrode. In another aspect, an elongated body of the electrode has a surface adapted to mate with the coolant tube. The surfaces of the tube and electrode may, for example, be flanges, tapered surfaces, contours, or steps.

30 Claims, 6 Drawing Sheets

METHOD AND APPARATUS FOR ALIGNMENT OF COMPONENTS OF A PLASMA ARC TORCH

FIELD OF THE INVENTION

The invention generally relates to the field of plasma arc torch systems and processes. In particular, the invention relates to liquid cooled electrodes and coolant tubes for use in a plasma arc torch.

BACKGROUND OF THE INVENTION

Material processing apparatus, such as plasma arc torches and lasers are widely used in the cutting of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. Gases used in the torch can be non-reactive (e.g., argon or nitrogen), or reactive (e.g., oxygen or air). The torch produces a plasma arc, which is a constricted ionized jet of a plasma gas with high temperature and high momentum.

Plasma arc cutting torches produce a transferred plasma arc with a current density that is typically in the range of 20,000 to 40,000 amperes/in$^2$. High definition torches are characterized by narrower jets with higher current densities, typically about 60,000 amperes/in$^2$. High definition torches produce a narrow cut kerf and a square cut angle. Such torches have a thinner heat affected zone and are more effective in producing a dross free cut and blowing away molten metal.

Similarly, a laser-based apparatus generally includes a nozzle into which a gas stream and laser beam are introduced. A lens focuses the laser beam which then heats the workpiece. Both the beam and the gas stream exit the nozzle through an orifice and impinge on a target area of the workpiece. The resulting heating of the workpiece, combined with any chemical reaction between the gas and workpiece material, serves to heat, liquefy or vaporize the selected area of the workpiece, depending on the focal point and energy level of the beam. This action allows the operator to cut or otherwise modify the workpiece.

Certain components of material processing apparatus deteriorate over time from use. These "consumable" components include, in the case of a plasma arc torch, the electrode, swirl ring, nozzle, and shield. Ideally, these components are easily replaceable in the field. Nevertheless, the alignment of these components within the torch is critical to ensure reasonable consumable life, as well as accuracy and repeatability of plasma arc location, which is important in automated plasma arc cutting systems.

Some plasma arc torches include a liquid cooled electrode. One such electrode is described in U.S. Pat. No. 5,756,959, assigned to Hypertherm, Inc. The electrode has a hollow elongated body with an open end and a closed end. The electrode is formed of copper and includes a cylindrical insert of high thermionic emissivity material (e.g., hafnium or zirconium) which is press fit into a bore in the bottom end of the electrode. The exposed end face of the insert defines an emission surface. Often the emission surface is initially planar. However, the emission surface may be initially shaped to define a recess in the insert as described in U.S. Pat. No. 5,464,962, assigned to Hypertherm, Inc. In either case, the insert extends into the bore in the bottom end of the electrode to a circulating flow of cooling liquid disposed in the hollow interior of the electrode. The electrode can be "hollowmilled" in that an annular recess is formed in an interior portion of the bottom end surrounding the insert. A coolant inlet tube having a hollow, thin-walled cylindrical body defining a cylindrical passage extending through the body is positioned adjacent the hollow interior surface of the electrode body. The tube extends into the recess in a spaced relationship to provide a high flow velocity of coolant over the interior surface of the electrode.

In many plasma arc torches and under a variety of operating conditions (e.g., high amperage cutting), the tube must remove the heat from the electrode by providing sufficient cooling to obtain acceptable electrode life. It has been empirically determined that if the outlet of the coolant tube is misaligned (longitudinally and/or radially) with the interior surface of the electrode, the tube does not sufficiently cool the insert. Repeated use of a torch having a coolant tube misaligned with the electrode causes the insert material to more rapidly wear away. To achieve desirable coolant flow characteristics, the tube is typically secured in a fixed position relative to the electrode to achieve proper alignment. Electrode wear typically results in reduced quality cuts. For example, the kerf width dimension may increase or the cut angle may move out of square as electrode wear increases. This requires frequent replacement of the electrode to achieve suitable cut quality.

Tolerances associated with conventional methods of mounting the electrode and coolant tube makes it more difficult for systems employing such torches to produce highly uniform, close tolerance parts without requiring frequent replacement of the electrode due to the errors inherent in positioning the electrode relative to the coolant tube.

It is therefore a principal object of this invention to provide electrodes and coolant tubes for a liquid-cooled plasma arc torch that aid in maintaining electrode life and/or reducing electrode wear by minimizing the effects of misalignment.

SUMMARY OF THE INVENTION

The invention, overcomes the deficiencies of the prior art by, in one aspect, providing a coolant tube for a plasma arc torch that achieves reliable and repeatable positioning of the coolant tube relative to the electrode. The invention, in another aspect, achieves reduced alignment errors in aligning respective longitudinal axes of an electrode and a coolant tube. The coolant tube has an elongated body that has a first end, a second end, and a coolant passage extending therethrough. The elongated body has a surface located on an exterior portion of the elongated body adapted to mate with an electrode.

Embodiments of this aspect of the invention can include the following features. The mating surface of the tube can include a contour, linear taper, step, or flange. The mating surface can have an enlarged diameter body integral with the elongated body. The enlarged diameter body can have a varying diameter. The mating surface of the tube can be fabricated so that the surface is adapted to align respective longitudinal axes of the elongated body and an electrode. The mating surface of the tube can be adapted for substantially concentrically, radially and/or circumferentially aligning respective longitudinal axes of the tube with an electrode. In addition or in the alternative, the mating surface can be adapted for aligning the elongated body and an electrode along the direction of a longitudinal axis of the elongated body. The mating surface of the tube can be located in an intermediate region between the first end and second end. The mating surface of the tube can be located at an end of the elongated body.

In another aspect, the invention includes an electrode for a plasma arc torch. The electrode includes a hollow elongated body having an open end and a closed end, and a surface located on an interior portion of the elongated body adapted to mate with a coolant tube.

Embodiments of this aspect of the invention can include the following features. The mating surface of the electrode can include a contour, linear taper, step, or flange. The mating surface can have a reduced diameter body integral with the elongated body. The reduced diameter body can have a varying diameter. The mating surface of the electrode can be adapted for substantially concentrically, radially and/or circumferentially aligning respective longitudinal axes of the electrode with a tube. In addition or in the alternative, the mating surface can be adapted for aligning the elongated body of the electrode with a tube along the direction of a longitudinal axis of the electrode.

In general, in another aspect, the invention involves a plasma arc torch that has a torch body. The plasma torch also has a coolant tube that has an elongated body. The elongated body of the tube has a first end, a second end, and a coolant passage extending therethrough, and a surface located on an exterior portion of the elongated body. The torch also has an electrode that is supported by the torch body. The electrode has a hollow elongated body that has an open end and a closed end, and a surface located on an interior portion of the elongated electrode body adapted to mate with the tube.

In this aspect of the invention, at least one of the surfaces can have a contour, linear taper, step or flange. The surface of the tube can have an enlarged diameter body integral with the elongated body of the tube, and the surface of the electrode can have a reduced diameter body integral with the elongated body of the electrode. At least one of the integral bodies can have a varying diameter. The mating surfaces can be adapted for substantially concentrically, radially and/or circumferentially aligning respective longitudinal axes of the tube and the electrode. In addition or in the alternative, the mating surfaces can be adapted for aligning the tube and an electrode along the direction of the respective longitudinal axes.

In general, in yet another aspect the invention relates to a method of locating a coolant tube relative to an electrode in a plasma arc torch. This method involves providing mating contact surfaces on the electrode and the coolant tube and biasing the electrode and the coolant tube into contact.

The method of locating the coolant tube relative to the electrode can involve biasing the tube and electrode into contact by the hydrostatic pressure of the coolant. The tube and electrode can be biased by, alternatively, a spring element.

In general, in another aspect, the invention involves a plasma arc torch that has a torch body. The torch also has a coolant tube that has an elongated body which has a first end, a second end, and a coolant passage extending therethrough. The torch also includes an electrode that is supported by the torch body. The electrode has a hollow elongated body that has an open end and a closed end. The torch also includes a means for mating surfaces of the coolant tube and the electrode.

The invention, in another aspect, achieves reduced alignment errors in aligning respective longitudinal axes of an electrode and a coolant tube. The coolant tube has an elongated body that has a first end, a second end, and a coolant passage extending therethrough. The elongated body has a surface located on an interior portion of the elongated body adapted to mate with an electrode.

The invention, in another aspect, achieves reduced alignment errors in aligning respective longitudinal axes of an electrode and a coolant tube. The coolant tube has an elongated body that has a first end, a second end, and a coolant passage extending therethrough. The elongated body has a surface located on an exterior portion of the elongated body adapted to mate with an electrode and align respective longitudinal axes of the electrode and coolant tube.

In another aspect, the invention includes an electrode for a plasma arc torch. The electrode includes a hollow elongated body having an open end and a closed end, and a surface located on an interior portion of the elongated body adapted to mate with a coolant tube and align respective longitudinal axes of the electrode and coolant tube.

In another embodiment, the invention offers an advantage over the prior art torch consumables (e.g., coolant tube and electrode) in which a mating surface is the primary measure to ensure proper alignment of the consumables.

In another embodiment, one aspect of the mating surface acts as a spacer to augment the ability to align, for example, a coolant tube and electrode when fixedly securing the coolant tube and/or electrode to a torch body.

The foregoing and other objects, aspects, features, and advantages of the invention will become more apparent from the following description and from the claims.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
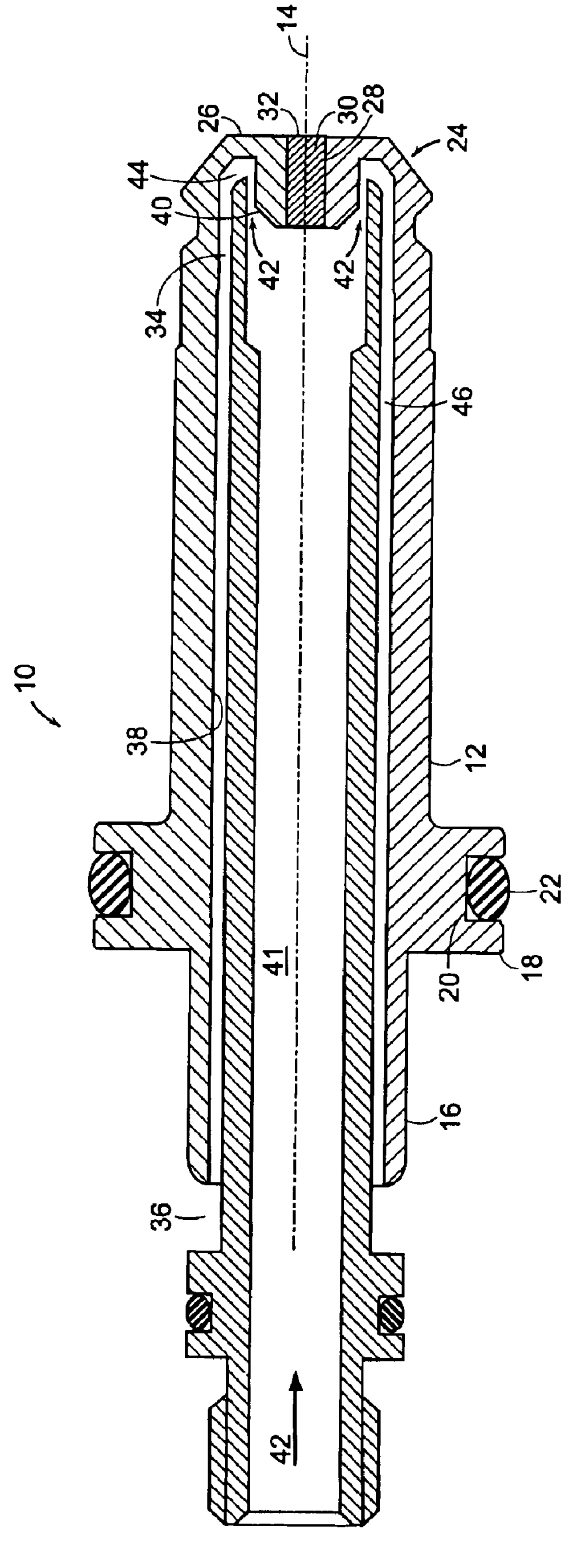
FIG. 1 PRIOR ART
FIG. 1 is a cross-sectional view of a prior art coolant tube disposed in a hollowmilled electrode.

FIG. 1 illustrates a prior art coolant tube disposed in a hollowmilled electrode suitable for use in a high definition torch (e.g., the HD-3070 torch manufactured by Hypertherm, Inc.). The electrode 10 has a cylindrical copper body 12. The body 12 extends along a centerline 14 of the electrode 10, which is common to the torch when the electrode is installed therein. The electrode can be replaceably secured in a cathode block (not shown) on the torch (not shown) by an interference fit. Alternatively, threads (not shown) can be disposed along a top end 16 of the electrode 10 for replaceably securing the electrode 10 in the cathode block. A flange 18 has an outwardly facing annular recess 20 for receiving an o-ring 22 that provides a fluid seal. The bottom end 24 of the electrode tapers to a generally planar end surface 26.

A bore 28 is drilled into the bottom end 24 of the body 12 along the centerline 14. A generally cylindrical insert 30 formed of a high thermionic emissivity material (e.g., hafnium) is press fit in the bore 28. The insert 30 extends axially through the bottom end 24 to a hollow interior 34 of the electrode 10. An emission surface 32 is located along the end face of the insert 30 and exposable to plasma gas in the torch. The emission surface 32 can be initially planar or can be initially shaped to define a recess in the insert 30.

A coolant tube 36 is disposed in the hollow interior 34 adjacent the interior surface 38 of the body 12 and the interior surface 40 of the bottom end 24. The tube 36 is hollow, generally cylindrical, thin-walled and defines a large diameter coolant passage 41. The coolant tube can be replaceably secured in a torch (not shown) by threads or an interference fit. By way of example, coolant tubes sold by Hypertherm, Inc. have a coolant passage diameter of about three to about four millimeters and is positioned less than about one millimeter from the interior surface of an annular recess 44 opposite the end face 26 of the electrode to provide sufficient cooling.

The tube 36 introduces a flow 42 of coolant through the passage 41, such as water, that circulates across the interior surface 40 of the bottom end 24 and along the interior surface 38 of the body 12. The electrode is hollowmilled in that it includes the annular recess 44 formed in the interior surface 40 of the bottom end 24. The recess 44 increases the surface area of the electrode body exposed to the coolant and improves the flow velocity of the coolant across the interior surface 40 of the body 12. The electrode, alternatively, may be "endmilled" in that that it does not define the annular recess 44. The flow 42 exits the electrode 10 via an annular passage 46 defined by the tube 36 and the interior surface 38 of the body 12. By way of example, when the tube 36 is used in a torch cutting at 100 amperes, the coolant flow is 1.0 gallons/minute.

During the service life of the electrode 10, the insert material wears away forming a pit of increasing depth in the bore 28. The cut quality of the torch typically degrades in conjunction with the insert wear. When the insert 30 has formed a pit of sufficient depth, a blowout condition occurs. Due to the proximity of the tube 36 to the interior surface 40 of the bottom end 24 of the electrode 10, the arc may attach to the tube during a blowout condition. The tube 36 becomes damaged by the arc and requires replacement. To prevent cut quality degradation and/or blowout, an operator typically replaces the electrode at frequent intervals. Further, manufacturers of plasma arc torch systems generally recommend replacement at certain insert wear levels to minimize the possibility of blowout.

Coolant flow 42 across the surface of the insert 30 is affected by the alignment of the coolant tube relative to the insert and, therefore, the electrode. If the outlet of the coolant tube is misaligned (e.g., longitudinally and/or radially) with respect to the interior surface 40 of the electrode 10, the coolant 42 delivered by the tube 36 does not sufficiently cool the insert 30. Repeated use of a torch having a coolant tube misaligned with respect to the electrode 10 has been empirically determined to cause the insert to more rapidly wear away.

Figure 2A:
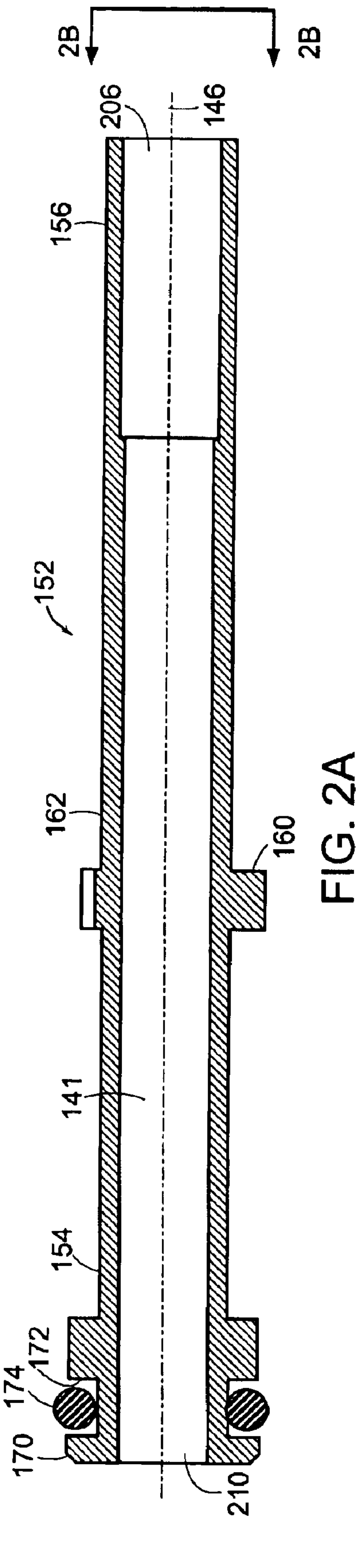
FIG. 2A is a cross-sectional view of a coolant tube, according to an illustrative embodiment of the invention.
Figure 2B:
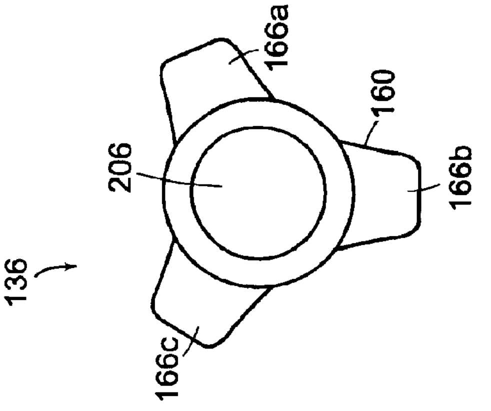
FIG. 2B is an end-view of the coolant tube of FIG. 2A.

FIGS. 2A and 2B illustrate one embodiment of a coolant tube 136 incorporating the principles of the invention. The tube 136 has an elongated body 152 with a first end 154 and a second end 156 and defines a centerline or longitudinal axis 146. A coolant passage 141 extends through the elongated body 152. The first end 154 of the tube 136 has a first opening 210 in fluid communication with the passage 141. The second end 156 has a second opening 206 in fluid communication with the passage 141. According to one aspect of the invention, the tube 136 has a mating surface 160 located on an exterior surface 162 of the elongated body 152. The mating surface 160 is designed to mate with a corresponding mating surface of an electrode of a plasma torch.

Figure 3:
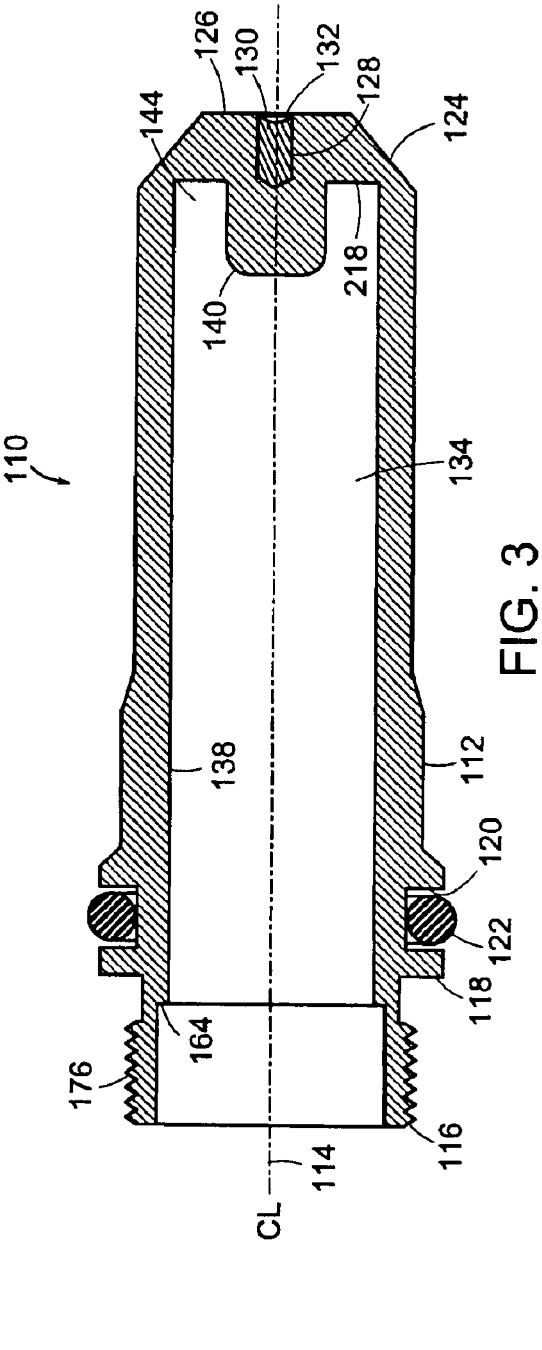
FIG. 3 is a cross-sectional view of an electrode, according to an illustrative embodiment of the invention.

The mating surface 160 is designed to permit reliable and repeatable alignment of the longitudinal axis 146 of the coolant tube 136 and a longitudinal axis, such as the longitudinal axis 114 of the electrode 110 of FIG. 3. The mating surface is capable of aligning the respective longitudinal axes of the coolant tube 136 and electrode, such that the longitudinal axes are at least substantially concentrically aligned. In addition or in the alternative, the mating surface can align the respective longitudinal axes of the coolant tube 136 and the electrode such that the coolant tube 136 and the electrode are at least substantially circumferentially aligned, thereby contemplating preferential alignment of the coolant tube 136 relative to the electrode.

It is not required that the coolant tube be rigidly attached to the torch body or the electrode. Some minimal, acceptable misalignment can, therefore, occur between the respective longitudinal axes of the coolant tube 136 and the electrode in embodiments of the invention in which the coolant tube 136 is not rigidly attached to the torch body or electrode.

Figure 11:
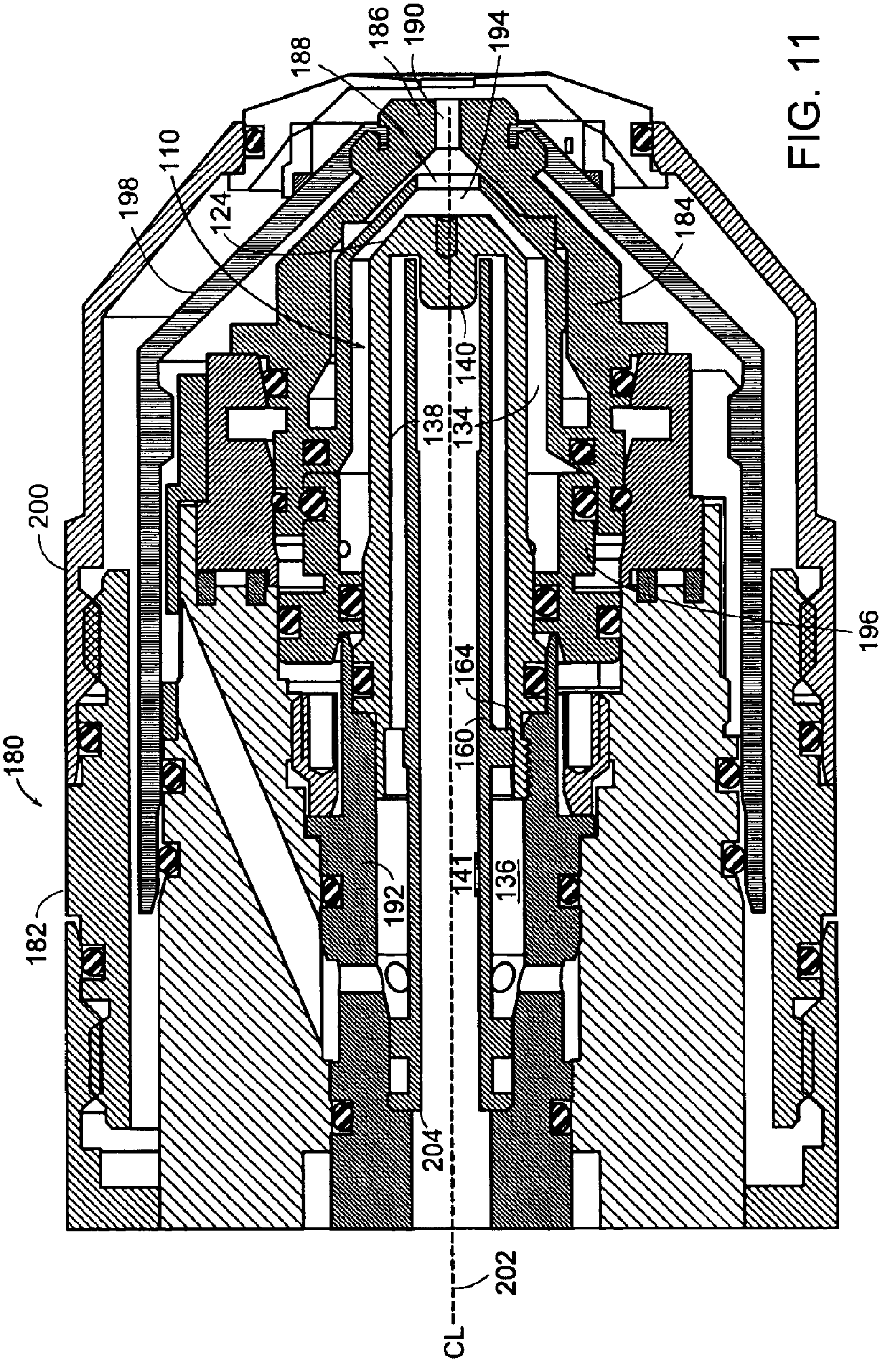
FIG. 11 is a partial cross-section of a plasma arc torch incorporating a coolant tube and electrode of the invention.

The tube 136 can be replaceably located within a torch body (see FIG. 11). The body 152 of the tube 136 has a flange 170 that has an outwardly facing annular recess 172 for receiving an o-ring 174. The o-ring 174 provides a fluid seal with the torch body (see FIG. 11) while generally allowing movement of the tube 136 along the lengthwise dimension of the body 152 of the tube 136.

The mating surface 160 of the tube 136, in this aspect of the invention, has three flanges **166*a*, 166*b* and 166*c* (generally 166) distributed around the exterior surface 162 of the elongated body 152 of the tube 136. The flanges 166 are generally equally spaced around the exterior surface 162. The flanges 166, in other embodiments, could be of any number, shape, or otherwise spaced around the exterior as may still permit the surface 160 to mate with a mating surface of an electrode. The surface 160, flanges 166 and/or parts thereof could be formed as an integral portion of the coolant tube 136 by, for example, machining or casting the tube 136. The surface 160, flanges 166 and/or parts thereof could, alternatively, be manufactured separately from the tube 136** and assembled or attached to the tube by, for example, a suitable adhesive or mechanical fastener.

FIG. 3 illustrates one embodiment of an electrode 110 incorporating the principles of the invention. The electrode

110 has a generally cylindrical elongated copper body 112. The body 112 generally extends along a centerline or longitudinal axis 114 of the electrode 110, which is common to the torch (not shown) when the electrode 110 is installed therein. Threads 176 disposed along a top end 116 of the electrode 110 can replaceably secure the electrode 110 in a cathode block (not shown) of the torch (not shown). A flange 118 has an outwardly facing annular recess 120 for receiving an o-ring 122 that provides a fluid seal with the torch body (not shown).

A drilled hole or bore 128 is located in a bottom end 124 of the electrode body 112 along the centerline 114. A generally cylindrical insert 130 formed of a high thermionic emission material (e.g., hafnium) is press fit into the hole 128. The insert 130 extends axially towards a hollow interior 134 of the electrode 110. An emission surface 132 is located along an end face of the insert 130 and exposable to plasma gas in the torch. The electrode is hollowmilled in that it includes an annular recess 144 formed in the interior surface 140 of the bottom end 124. The recess 144 increases the surface area of the electrode body exposed to the coolant and improves the flow velocity of the coolant across the interior surface 140 of the body 112. The electrode, alternatively, may be endmilled such that that it does not define an annular recess 144.

A surface 164 is provided on an inner surface 138 of the electrode body 112 and the surface 164 is adapted for mating with a corresponding surface, such as the surface 160 of the coolant tube 136 of FIG. 2A. The surface 164 of electrode 110 may be formed on the interior surface 138 by machining or an alternative, suitable manufacturing process.

Figure 4B:
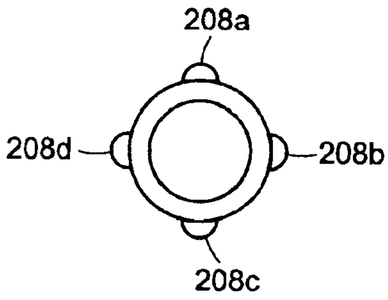
FIG. 4B is an end-view of the coolant tube of FIG. 4A.
Figure 4A:
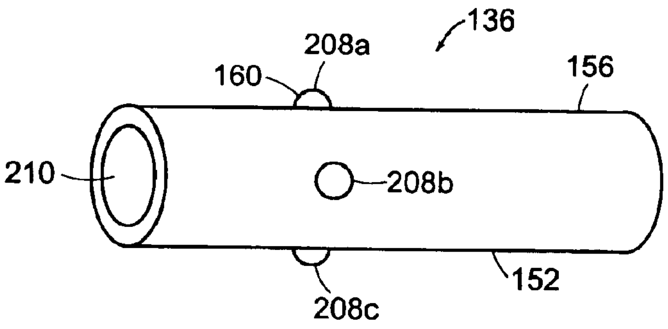
FIG. 4A is a schematic side view of a coolant tube, according to an illustrative embodiment of the invention.

In an alternative embodiment of the invention, as illustrated in FIGS. 4A and 4B, the surface 160 of the coolant tube 136 has four spherical elements 208*a*, 208*b*, 208*c*, and 208*d* (generally 208). The four elements 208 are adapted to mate with a surface of a plasma arc torch electrode. The shape of the elements, alternatively, could be any geometric shape (e.g., ellipsoidal, diamond-shaped, or cylindrical) that is compatible with mating with a corresponding surface of an electrode and promoting adequate cooling of the electrode.

Figure 5B:
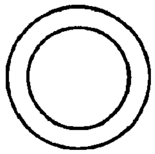
FIG. 5B is an end-view of the coolant tube of FIG. 5A.
Figure 5A:
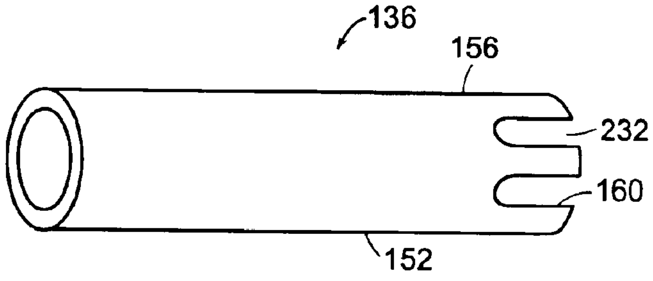
FIG. 5A is a schematic side view of a coolant tube, according to an illustrative embodiment of the invention.

In an alternative embodiment of the invention, as illustrated in FIGS. 5A and 5B, the surface 160 of the coolant tube 136 has a plurality of slots 210 located at the second end 156 of tube 136. The slots 232 are adapted to permit coolant to flow out of the passage 141. In this embodiment, the second end 156 of the tube 136 contacts an inner surface of an electrode wall, such as the inner surface 218 of the electrode 110 of FIG. 3. The slots 232 permit adequate coolant flow across the interior surface 140 of the electrode 110.

Figure 6B:
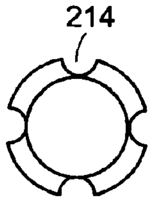
FIG. 6B is an end-view of the coolant tube of FIG. 6A.
Figure 6A:
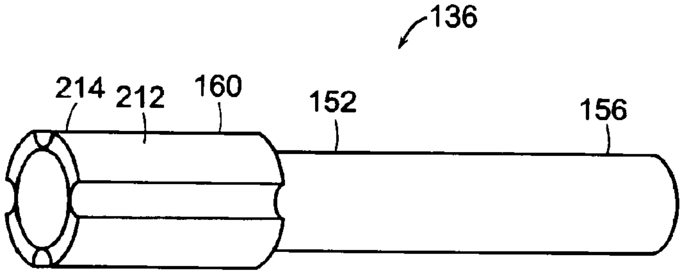
FIG. 6A is a schematic side view of a coolant tube, according to an illustrative embodiment of the invention.

In an alternative embodiment of the invention, as illustrated in FIGS. 6A and 6B, the surface 160 of the coolant tube 136 has an enlarged diameter body 212 relative to the body 152 of the tube 136. The body 212 has four grooves 214 oriented along the length of the body 152 of the tube 136. The enlarged diameter body 212 is adapted to mate with a surface of a plasma arc torch electrode.

Figure 7B:
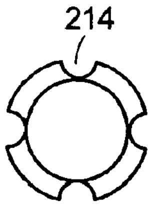
FIG. 7B is an end-view of the coolant tube of FIG. 7A.
Figure 7A:
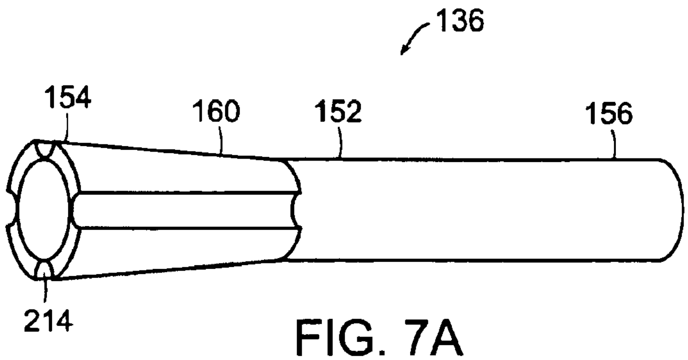
FIG. 7A is a schematic side view of a coolant tube, according to an illustrative embodiment of the invention.

In an alternative embodiment of the invention, as illustrated in FIGS. 7A and 7B, the surface 160 of the coolant tube 136 has a contour that has a linear taper. The linear taper decreases in diameter from the first end 154 towards second end 156. The contour of the surface 160 is adapted to mate with an inside surface of an electrode, such as the surface 214 of the inside surface 138 of the electrode 110 of FIG. 10.

Figure 10:
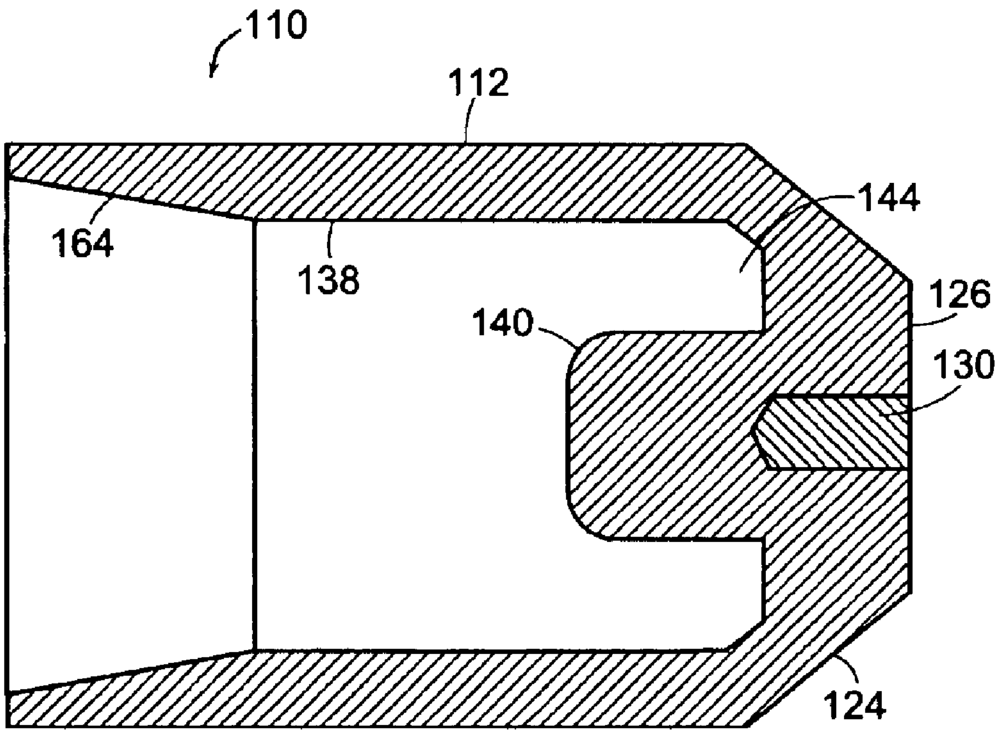
FIG. 10 is a schematic side view of an electrode, according to an illustrative embodiment of the invention.

In an alternative embodiment of the invention, as illustrated in FIG. 10, the surface 164 of the inside surface 138 of the electrode 110 has a contour that has a linear taper that is adapted to mate with the surface 160 of a coolant tube, such as the coolant tube 136 of FIG. 7A.

Figure 8B:
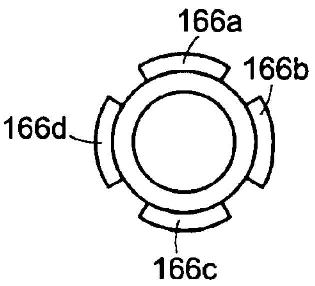
FIG. 8B is an end-view of the coolant tube of FIG. 8A.
Figure 8A:
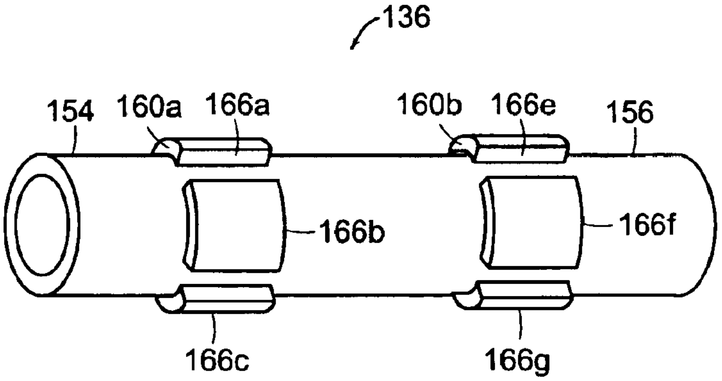
FIG. 8A is a schematic side view of a coolant tube, according to an illustrative embodiment of the invention.

In an alternative embodiment of the invention, as illustrated in FIGS. 8A and 8B, the coolant tube 136 has two surfaces 160*a* and 160*b*. The surfaces 160*a* and 160*b* are adapted to mate with corresponding surfaces of an electrode of a plasma arc torch. The surface 160*a* has four flanges 166*a*, 166*b*, 166*c*, and 166*d* equally spaced around the outside diameter of the body 152 of the tube 136. The surface 160*b* has four flanges 166*e*, 166*f*, 166*g*, and 166*h* (not shown) equally spaced around the outside diameter of the body 152 of the tube 136.

Figure 9A:
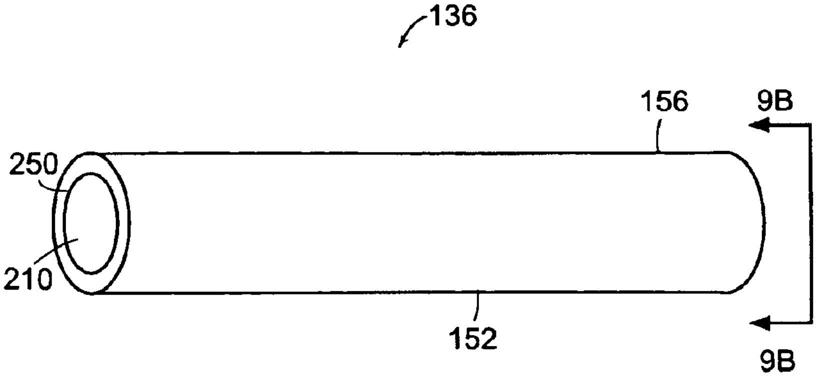
FIG. 9A is a schematic side view of a coolant tube, according to an illustrative embodiment of the invention.
Figure 9B:
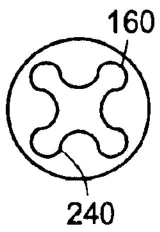
FIG. 9B is an end-view of the coolant tube of FIG. 9A.

In another embodiment of the invention, as illustrated in FIGS. 9A and 9B, the coolant tube 136 has a surface 160 located on an interior surface 250 of the body 152 of the tube 136. The surface 160 is adapted to mate with an interior surface, such as the interior surface 140 of the electrode 110 of FIG. 3. The surface 160 has four flanges 240 equally spaced around the inside diameter of the body 152 of the tube 136. The flanges 240 contact the interior surface 140 of the electrode 110 when located within a plasma arc torch. By way of example, the electrode 110 can be secured in the body of a plasma arc torch such that the interior surface 140 of the electrode 110 mates with the surface 160 and flanges 240 of the tube 136, thereby aligning respective longitudinal axes of the tube 136 and electrode 136 and limiting motion of the tube 136 relative to the electrode 110.

FIG. 11 shows a portion of a high-definition plasma arc torch 180 that can be utilized to practice the invention. The torch 180 has a generally cylindrical body 182 that includes electrical connections, passages for cooling fluids and arc control fluids. An anode block 184 is secured in the body 182. A nozzle 186 is secured in the anode block 184 and has a central passage 188 and an exit passage 190 through which an arc can transfer to a workpiece (not shown). An electrode, such as the electrode 110 of FIG. 3, is secured in a cathode block 192 in a spaced relationship relative to the nozzle 186 to define a plasma chamber 194. Plasma gas fed from a swirl ring 196 is ionized in the plasma chamber 194 to form an arc. A water-cooled cap 198 is threaded onto the lower end of the anode block 184, and a secondary cap 200 is threaded onto the torch body 182. The secondary cap 200 acts as a mechanical shield against splattered metal during piercing or cutting operations.

A coolant tube, such as the coolant tube 136 of FIG. 2A is disposed in the hollow interior 134 of the electrode 110. The tube 136 extends along a centerline or longitudinal axis 202 of the electrode 110 and the torch 180 when the electrode 110 is installed in the torch 180. The tube 136 is located within the cathode block 192 so that the tube 136 is generally free to move along the direction of the longitudinal axis 202 of the torch 180. A top end 204 of the tube 136 is in fluid communication with a coolant supply (not shown). The flow of coolant travels through the passage 141 and exits an opening 206 located at a second end 156 of the tube 136. The coolant impinges upon the interior surface 140 of the bottom end 124 of the electrode 110 and circulates along the interior surface 138 of the electrode body 112. The coolant flow exits the electrode 110 via the annular passage 134 defined by the tube 136 and the interior surface 138 of the electrode.

In operation, because the coolant tube 136 is not rigidly fixed to the cathode block 180 in this embodiment of the invention, the flow or hydrostatic pressure of coolant fluid acts to bias the tube 136 towards a bottom end 124 of the electrode 110. Alternatively, a spring element (e.g., linear spring or leaf spring) may be used to bias the tube 136 towards the electrode 110. Alternatively, the electrode 110 may be threaded into the torch body until the surfaces 160 and 164 of the tube 136 and electrode 110, respectively, mate with each other, thereby biasing the surfaces 160 and 164 together. The coolant tube 136 has a surface 160 located on an exterior surface 162 of the tube body 152. The surface 160 is adapted to mate with a surface 164 located on an interior surface 138 of the electrode body 112. The surfaces 160 and 164 of the tube 136 and electrode 110, respectively, mate with each other to align the position of the tube 136 relative to the electrode 110 during operation of the torch. The tube 136 and electrode 110 are aligned longitudinally as well as radially in this aspect of the invention.

Variations, modifications, and other implementations of what is described herein will occur to those of ordinary skill without departing from the spirit and the scope of the invention. Accordingly, the invention is not to be defined only by the preceding illustrative description.

What is claimed is:

1. A coolant tube for a plasma arc torch, the coolant tube comprising:

an elongated body having a first end, a second end, and a coolant passage extending therethrough, wherein the elongated body is not rigidly attachable to a torch body; and a surface located on an exterior portion of the elongated body adapted to mate and align with an electrode along a direction of a longitudinal axis of the elongated body, wherein an opening in the second end of the elongated body does not contact an inner surface of the electrode.

2. The tube of claim 1 wherein the surface comprises at least one or more of a contour, step, or flange.

3. The tube of claim 2 wherein the contour comprises a linear taper.

4. The tube of claim 1 wherein the surface has an enlarged diameter body integral with the elongated body.

5. The tube of claim 4 wherein the enlarged diameter body has a varying diameter.

6. The tube of claim 1 wherein the surface is adapted to align respective longitudinal axes of the elongated body and the electrode.

7. The tube of claim 6 wherein the longitudinal axes are at least one or more of substantially concentrically aligned, radially aligned, or circumferentially aligned.

8. The tube of claim 1 wherein the surface is located in a region between the first end and second end.

9. The tube of claim 1 wherein the surface is located at an end of the elongated body.

10. The coolant tube of claim 1 wherein the elongated body is capable of movement along the longitudinal axis of the body.

11. The coolant tube of claim 10 wherein the elongated body is capable of movement along the longitudinal axis of the body relative to the electrode.

12. An electrode for a plasma arc torch, the electrode comprising:

a hollow elongated body having an open end and a closed end; and a surface located on an interior portion of the elongated body adapted to mate and align with a coolant tube along a direction of a longitudinal axis of the coolant tube, wherein the coolant tube is not rigidly attachable to a torch body and an opening in the second end of the coolant tube does not contact an inner surface of the electrode.

13. The electrode of claim 12 wherein the surface comprises at least one or more of a contour, step, or flange.

14. The electrode of claim 13 wherein the contour comprises a linear taper.

15. The electrode of claim 12 wherein the surface has a reduced diameter body integral with the elongated body.

16. The electrode of claim 15 wherein the reduced diameter body has a varying diameter.

17. The electrode of claim 12 wherein the surface is adapted to align respective longitudinal axes of the elongated body and a coolant tube.

18. The electrode of claim 17 wherein the longitudinal axes are at least one or more of substantially concentrically aligned, radially aligned, or circumferentially aligned.

19. A plasma arc torch comprising:

a torch body;

a coolant tube, the tube comprising an elongated body having a first end, a second end, and a coolant passage extending therethrough, and a surface located on an exterior portion of the elongated body, wherein the elongated body is not rigidly attachable to the torch body; and an electrode supported by the torch body, the electrode comprising a hollow elongated body having an open end and a closed end, and a surface located on an interior portion of the elongated electrode body adapted to mate and align with the tube along a direction of a longitudinal axis of the tube, wherein an opening in the second end of the coolant tube does not contact an inner surface of the electrode.

20. The torch of claim 19 wherein at least one of the surfaces comprises at least one or more of a contour, step, or flange.

21. The torch of claim 20 wherein the contour comprises a linear taper.

22. The torch of claim 19 wherein the surface of the tube has an enlarged diameter body integral with the elongated body of the tube, and the surface of the electrode has a reduced diameter body integral with the elongated body of the electrode.

23. The torch of claim 22 wherein at least one of the integral bodies has a varying diameter.

24. The torch of claim 19 wherein the surfaces are adapted to align respective longitudinal axes of the electrode and coolant tube.

25. The torch of claim 24 wherein the longitudinal axes are at least one or more of substantially concentrically aligned, radially aligned, or circumferentially aligned.

26. A plasma arc torch comprising:

a torch body;

an electrode supported by the torch body, the electrode comprising a hollow elongated body having an open end and a closed end;

a coolant tube, the tube comprising an elongated body having a first end, a second end, and a coolant passage extending therethrough, wherein the elongated body is not rigidly attachable to the torch body; and means for aligning mating surfaces of the coolant tube and the electrode along a direction of a longitudinal axis of the tube, wherein an opening in the second end of the coolant tube does not contact an inner surface of the electrode.

27. The torch of claim 26 wherein the means for aligning comprises a mating surface on the inner surface of the electrode.

28. The torch of claim 26 wherein the means for aligning comprises a mating surface on the outer surface of the tube.

29. The torch of claim 26 wherein the means for aligning comprises a mating surface on the inner surface of the coolant tube.

30. A coolant tube for a plasma arc torch, the coolant tube comprising:

an elongated body having a first end, a second end, and a coolant passage extending therethrough, wherein the elongated body is not rigidly attachable to a torch body; and a surface located on an exterior portion of the elongated body adapted to (a) mate with an electrode and (b) align respective longitudinal axes of the electrode and coolant tube along a direction of the respective longitudinal axes, wherein an opening in the second end of the elongated body does not contact an inner surface of the electrode.

* * * * *